Patented Oct. 27, 1936

2,058,851

UNITED STATES PATENT OFFICE 2,058,851

PROCESS FOR SULPHATING MIXTURES OF OLEFINES

Benjamin T. Brooks, Greenwich, Conn., assignor, by mesne assignments, to Standard Alcohol Company, Wilmington, Del., a corporation of Delaware No Drawing. Application September 16, 1930, Serial No. 482,373

10 Claims. (Cl. 260—99.12)

This invention is applicable to the products of cracking of hydrocarbon oils derived from any source, including, for example, the products of cracking petroleum or shale oils. Such oils, and others of similar character containing normally liquid and/or solid hydrocarbons, will be hereinafter comprehended by the term "mineral oil".

When such oils are cracked to produce gasoline, a continuous series of hydrocarbons is obtained ranging from the hydrocarbons present in the raw material, through kerosene and gasoline to normally gaseous hydrocarbons, including methane. The normally liquid hydrocarbons are ordinarily separated by condensation and/or absorption leaving a residue of normally gaseous hydrocarbons consisting predominantly of hydrocarbons of not exceeding 4 carbon atoms to the molecule but which may include minor proportions of hydrocarbons of more than 4 carbon atoms to the molecule. The olefine content of such a mixture consists predominantly of olefines of 4 and less than 4 carbon atoms to the molecule, although minor proportions of olefines (normally liquid) of 5 and possibly of 6 carbon atoms to the molecule may be present. This normally gaseous material may be of complex composition and ordinarily includes saturated hydrocarbons, normal and iso olefines together with diolefines. I may operate either on this raw material or may subject this raw material to a process of separation (cf. oil absorption) for the purpose of rejecting the major part of the hydrogen and methane. In either case, the raw material which is the subject matter of my process will contain a mixture of olefines and diolefines which are predominantly of not exceeding 4 carbon atoms to the molecule, viz., the raw material will consist predominantly of butylenes and butadiene.

It is possible to produce alcohols from such a mixture by sulphating the olefines contained therein with aqueous sulphuric acid, and this may be accomplished by passing the mixture counter-currently in contact with aqueous sulphuric acid of appropriate strength. In any single stage operation of this character, the strength of acid employed is necessarily a compromise between that which will absorb the olefines of highest molecular weight without polymerization and that concentration requisite to absorb the olefines of lowest molecular weight. For this reason efforts have been directed to absorbing the olefines in aqueous sulphuric acid in olefinic groups of descending molecular weight in several steps, with acid of increasing concentration. In this case, however, as I have found, the absorption is not highly selective and does not yield all recoverable values of the olefines and diolefines present.

I have discovered that the single stage absorption of olefines from such a mixture by the use of aqueous sulphuric acid, and particularly the selective absorption of olefines from such a mixture in groups of descending molecular weight, are very substantially enhanced in efficiency by subjecting the mixture to a preliminary treatment adapted to remove therefrom the tertiary olefines and the diolefines in unpolymerized condition. This procedure has the further advantage that the diolefine, butadiene, so removed is a valuable material for a variety of purposes, particularly the synthesis of rubber and other chemical condensation products. The removal of either or both of these materials by polymerization does not produce equivalent results for the reason that the materials do not polymerize selectively, but invariably substantial proportions of the desired normal mono olefines are simultaneously degraded to heavy polymers of low value. Also the polymerized material, a heavy high boiling oil, holds the unchanged olefines in solution and interferes with or greatly retards their sulphation.

When starting with a mixture of the type described, I preferably first remove the diolefines by any process appropriate to this end.

A preferred method consists in passing the mixture into contact with a slurry of cuprous chloride in an aqueous solution. I find that excellent absorption efficiencies are achieved by employing a slurry of solid finely divided cuprous chloride in an aqueous solution containing ammonium chloride. The latter material is preferably present in the ratio of from 5 to 20 parts thereof for every 100 parts of $H_2O$ present. This operation may conveniently be performed in a bubble tower in which the hydrocarbon mixture is passed upwardly in counter-current contact with a descending slurry of cuprous chloride and ammonium chloride solution. It will, of course, be apparent to anyone skilled in the arts that the amount of cuprous chloride must be at least sufficient to combine with substantially all of the diolefines present. The resulting cuprous chloride diolefine compounds may be regenerated by processes which are not integral with this invention.

The remanent mixture is thereafter subjected to suitable treatment for the removal of tertiary olefines therefrom, and this may be accomplished, for example, by treatment with dilute sulphuric acid at normal temperatures or with stronger sulphuric acid at relatively low temperatures. I may accomplish this result by contacting the mixture with aqueous sulphuric acid of not exceeding 70%, $H_2SO_4$ content, at temperatures not exceeding 30° C., although I preferably accomplish the result by the use of aqueous sulphuric acid of 60 to 65%, $H_2SO_4$ content, at temperatures not exceeding 25° C. This operation may also be performed in a bubble tower type of absorber, and it will be apparent to anyone skilled in the arts that the quantity of sulphuric acid must be at least sufficient to combine with all of the tertiary olefines present in the mixture.

The hydrocarbon mixture so produced which is now substantially free from diolefines and tertiary olefines is ready for the absorption of olefines therefrom which may be accomplished by a single treatment with aqueous sulphuric acid, say from 75 to 85%, $H_2SO_4$ content, but is preferably subjected to a selective absorption with the resultant production of a sharper separation of olefines of any particular group at any particular stage of the treatment, together with a higher yield and a better product than is obtainable under prior art processes.

For this purpose the mixture is preferably passed first into contact with aqueous sulphuric acid of not exceeding 75%, $H_2SO_4$ content, say from 65 to 75%, at appropriate temperatures, for the reaction of the normal butene present. With acid of from 65 to 70%, $H_2SO_4$ content, I find temperatures of from 35 to 60° preferable; whereas, with acid of from 70 to 75%, $H_2SO_4$ content, I prefer temperatures of from 25 to 35° C. This operation may be conveniently carried out in a bubble tower type of absorber, and the butyl sulphate so produced may be thereafter worked up for butyl alcohol and/or other useful products. Any small proportion of amylene, if present, will be simultaneously absorbed.

The remanent mixture from this operation which is now substantially free from normal butene is next subjected to appropriate treatment for the absorbing of the propylene. This is preferably accomplished by the employment of aqueous sulphuric acid from 75 to 85%, $H_2SO_4$ content, at temperatures between 30 and 60° C. With acid concentrations of from 75 to 80% temperatures of 40 to 60° C. are preferred, and with acid strengths from 80 to 85% temperatures of from 20 to 40° C. are preferred. This absorption is facilitated by the application of pressure, and for this purpose pressures in excess of 30 pounds and preferably in excess of 100 pounds to the square inch may be advantageously employed. This absorption of the propylene may be carried only to the point of making the mono alkyl sulphate or by appropriate application of pressure, and by leaving the materials in contact for a sufficient length of time may be caused to proceed to forming, either predominantly or in part, di-isopropyl sulphate. The term "sulphation" as employed in the description and claims, shall comprehend any reaction with sulphuric acid resulting in the formation of either mono or dialkyl sulphates.

The remanent mixture from this operation is now substantially free from propylene and may now be subjected to further treatment with the absorption of the ethylene present. This may be accomplished by contacting the mixture with aqueous sulphuric acid of from 85 to 100%, $H_2SO_4$ content, at elevated temperatures, but is preferably accomplished by the use of acid of from 85 to 95%, $H_2SO_4$ content, at temperatures of from 30 to 100° C. and at pressures in excess of 200 pounds to the square inch, and preferably in excess of 350 pounds to the square inch.

I preferably employ an acid concentration of from 90 to 95% at a temperature of from 65 to 85° C., and a pressure in excess of 350 pounds. The acid should be present in quantity at least sufficient to combine with the ethylene present. By the application of pressure just described, and by leaving the materials in contact for a sufficient length of time, I find that the acid may be predominantly converted into diethyl sulphate.

Both the dipropyl and diethyl sulphates hereinbefore mentioned will be found to be much more nearly free from undesirable polymers than would be possible without the preliminary removal of diolefines and iso-olefines, and will be found to yield on hydrolysis superior grades of alcohols.

The specific methods of sulphating the propylene and ethylene are the subject matter of separate copending applications. The method of sulphating the ethylene is the subject matter of my copending application Serial No. 474,302, and the method of sulphating the propylene is the subject matter of copending application of E. J. Cardarelli and myself Serial No. 501,469.

The foregoing specific description is for purposes of illustration and not of limitation. It is therefore my intention that the invention be limited only by the appended claims or their equivalents in which I have endeavored to claim broadly all inherent novelty.

I claim:

1. Process of sulphating olefines occurring in a mixture of hydrocarbons derived from the cracking of mineral oil and containing mixed olefines which are predominantly of not exceeding 4 carbon atoms including tertiary and diolefines, which comprises selectively removing without polymerization the diolefines from said mixture by forming chemical compounds of which the diolefine becomes one of the components thereafter removing from the diolefine free mixture the tertiary olefines by contacting said mixture with aqueous sulphuric acid while maintaining an acid concentration and temperature at which the tertiary olefines are selectively absorbed, thereafter removing the normal butylenes with not more than minor proportions of the propylene present by contacting said mixture with aqueous sulphuric acid while maintaining an acid concentration and a temperature at which the butylenes are selectively absorbed, and thereafter absorbing the propylene by contacting said mixture with aqueous sulphuric acid while maintaining an acid concentration and a temperature at which the propylene is absorbed.

2. Process according to claim 1, in which the preliminary removal of diolefines from said mixture is accomplished by contacting said mixture with a slurry of cuprous chloride in an aqueous solution containing ammonium chloride.

3. Process of sulphating olefines occurring in a mixture of hydrocarbons derived from mineral oil and containing mixed olefines which are predominantly of not exceeding 4 carbon atoms, which comprises selectively removing without polymerization the diolefines from said mixture by forming chemical compounds of which the diolefine becomes one of the components, thereafter removing from the diolefine free mixture the tertiary olefines by contacting said mixture with aqueous sulphuric acid while maintaining an acid concentration and temperature at which the tertiary olefines are selectively absorbed, thereafter sulphating the normal butylene present with not more than minor proportions of the propylene present by contacting said mixture with aqueous sulphuric acid while maintaining an acid concentration and a temperature at which the butylene is absorbed, thereafter absorbing the propylene with only minor proportions of the ethylene by contacting said mixture with aqueous sulphuric acid while maintaining an acid concentration and a temperature at which propylene is absorbed, and thereafter absorbing the ethylene by contacting said mixture with aqueous sulphuric acid while maintaining an acid concentration and a temperature at which ethylene is absorbed.

4. Process according to claim 3, in which the preliminary removal of diolefines from said mixture is accomplished by contacting said mixture with a slurry of cuprous chloride in an aqueous solution containing ammonium chloride.

5. Process of sulphating olefines occurring in a mixture of hydrocarbons derived from the cracking of mineral oil and containing mixed olefines which are predominantly of not exceeding 4 carbon atoms and include tertiary and di-olefines, which comprises selectively removing without polymerization the diolefines from said mixture by forming chemical compounds of which the diolefine becomes one of the components, thereafter removing from the diolefine free mixture the tertiary olefines by contacting said mixture with aqueous sulphuric acid while maintaining an acid concentration and temperature at which the tertiary olefines are selectively absorbed, thereafter sulphating the butylenes contained in said mixture with not more than minor proportions of the propylene by contacting said mixture with aqueous sulphuric acid of from 65 to 75%, $H_2SO_4$ content, at temperatures between 20 and 60° C., thereafter sulphating the propylene contained in said mixture by contacting said mixture with aqueous sulphuric acid while maintaining an acid concentration and a temperature at which the propylene is absorbed.

6. Process according to claim 5, in which the preliminary removal of diolefines from said mixture is accomplished by contacting said mixture with a slurry of cuprous chloride in an aqueous solution containing ammonium chloride.

7. Process according to claim 5, in which the absorption of propylene is accomplished by contacting said mixture with sulphuric acid of from 75 to 85%, $H_2SO_4$ content, at temperatures between 30 and 60° C.

8. Process of sulphating olefines occurring in a mixture of hydrocarbons derived from the cracking of petroleum oil and containing mixed olefines which are predominantly of not exceeding 4 carbon atoms and include tertiary and di-olefines, which comprises selectively removing without polymerization the diolefines from said mixture by forming chemical compounds of which the diolefine becomes one of the components, thereafter removing from the diolefine free mixture the tertiary olefines by contacting said mixture with aqueous sulphuric acid not exceeding 70% strength at about 25° C. to sulphate the tertiary olefines, thereafter sulphating the normal butylene present with not more than minor proportions of the propylene by contacting said mixture with aqueous sulphuric acid of from 65 to 75%, $H_2SO_4$ content, at temperatures between 20 and 40° C., thereafter sulphating the propylene present with not more than minor proportions of the ethylene by contacting said mixture with aqueous sulphuric acid of from 75 to 85%, $H_2SO_4$ content, at temperatures between 30 and 60° C., and thereafter sulphating the ethylene present in said mixture.

9. Process according to claim 8, in which the preliminary removal of diolefines from said mixture is accomplished by contacting said mixture with a slurry of cuprous chloride in an aqueous solution containing ammonium chloride.

10. Process according to claim 8, in which the sulphation of the ethylene is accomplished by contacting said mixture with aqueous sulphuric acid of from 85 to 95%, $H_2SO_4$ content, at temperatures between 30 and 100° C. and under pressures in excess of 200 pounds to the square inch.

BENJAMIN T. BROOKS.